UNITED STATES PATENT OFFICE.

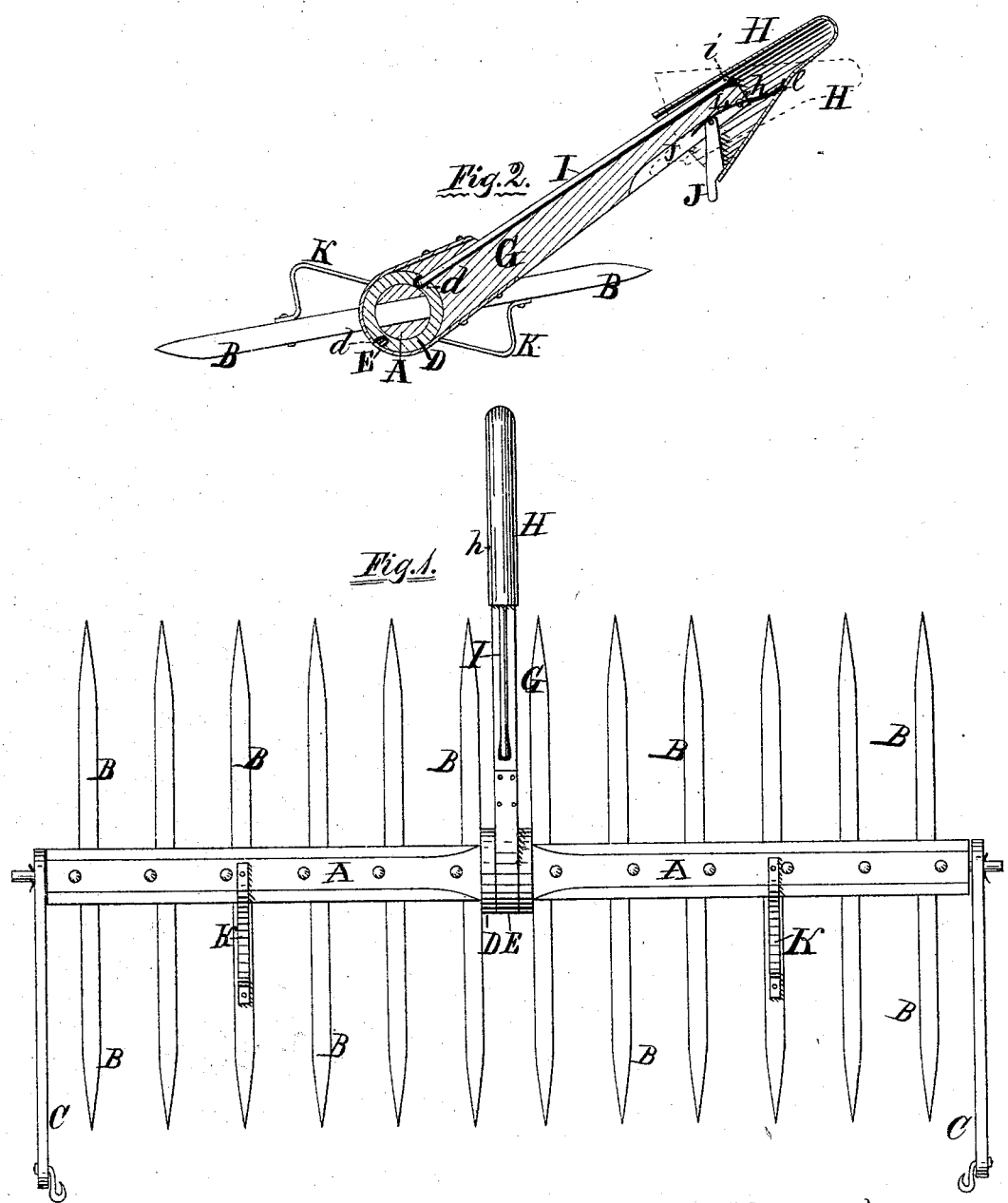

MOSES K. FLORY, OF VIOLA, ILLINOIS.

IMPROVEMENT IN REVOLVING HORSE-RAKES.

Specification forming part of Letters Patent No. 143,684, dated October 14, 1873; application filed September 2, 1873.

*To all whom it may concern:*

Be it known that I, MOSES K. FLORY, of Viola, county of Mercer and State of Illinois, have invented certain Improvements in Horse-Rakes, of which the following is a specification:

The nature of my invention relates to improvements in what is known as horse-rakes for collecting hay into windrows or otherwise; and the invention consists in certain improvements hereinafter fully described and pointed out in the claim of this specification.

Figure 1 is a top plan or view of my invention, and Fig. 2 is a cross-section of Fig. 1 on the line $x\ x$.

A is the rake-head; B B B B B B, the teeth; and C C the draft-bars, working on journals at each end of the head. D is a collar with a groove around its periphery, and is secured to the central part of the head A. E is a strap fitted around the groove in the collar D, and its ends attached to a handle, G. $d\ d$ are recesses or holes in opposite sides of the collar D. H is a horn or handle, pivoted to and over the outer end of the handle G at the point $h$. I is a catch-rod, pivoted at $i$ in the horn H, and extending down a groove in the upper side of the handle G, and through a passage in the lower enlarged end of said handle, to the collar D. J is a latch, pivoted at its upper end to the lower side of the handle G and within the horn H. K K are slides for keeping the rake-teeth at the proper elevation. L is a spring, one end of which is secured to the hollow handle H at $l$. The other or free end bears against the handle G, as shown in Fig. 2 of the drawings.

The operation is as follows: When the rake is in position for operation, as shown at Fig. 2, the lower end of the catch-rod I will engage with one of the recesses $d\ d$, and the latch J, dropping to the position shown within the horn H by its own gravity, will hold all the parts in said working position. When it is desired to revolve the rake, the operator presses down the rear end of the pivoted hollow handle H, when, through the catch I being pivoted to the handle, the catch is withdrawn from the recess $d$, and the rake is permitted to revolve until the opposite recess comes up. In pressing down the handle H the latch J is pressed into the recess in the handle G, and when the pressure is removed the latch drops down by its own gravity, and the spring L forces back the hollow handle H to its original position, when the catch I again engages with one of the recesses $d$. In this way it will be seen that the rake is permitted to revolve by simply pressing on the hollow handle H, and when the pressure is removed it is again secured in proper working position.

What I claim as my invention is—

The horn or hollow handle H, spring L, handle G, catch I, and latch J, all constructed and arranged to operate in the manner and for the purpose specified.

MOSES K. FLORY.

Witnesses:
 JOSEPH STAFFORD,
 C. M. PHARES.